Figure 1:
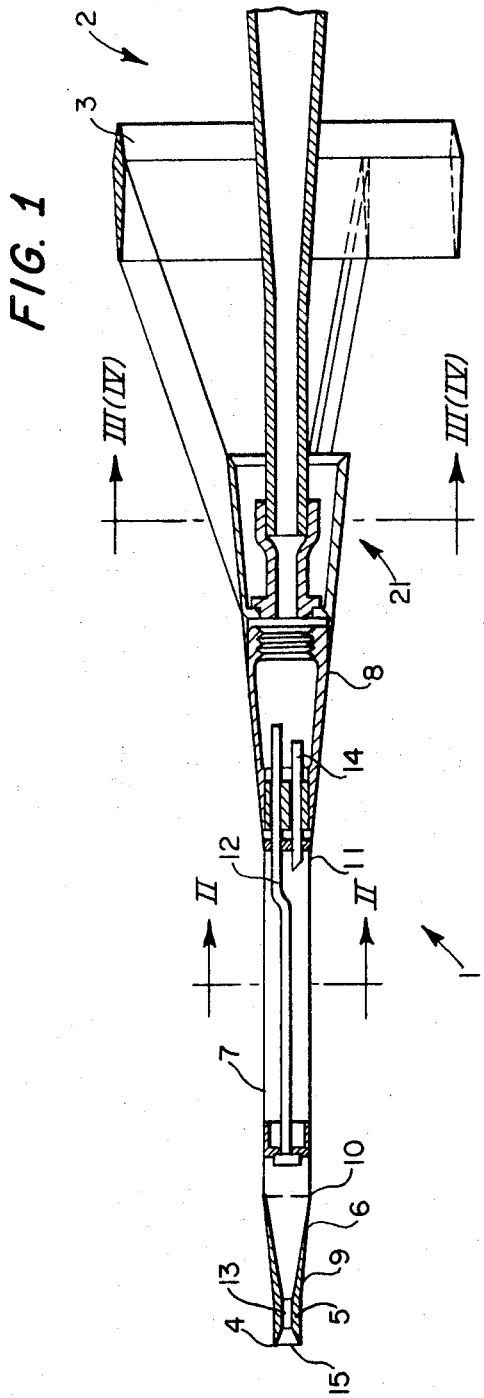

United States Patent [19]
Partzsch

[11] 3,750,470
[45] Aug. 7, 1973

[54] FLOW SONDE FOR MEASURING THE TOTAL PRESSURE AND THE STATIC PRESSURE OF A FLOW

[75] Inventor: Peter Partzsch, Eichenau near Munich, Germany

[73] Assignee: Dornier A.G., Friedrichshafen/Bodensee, Germany

[22] Filed: Oct. 18, 1971

[21] Appl. No.: 189,932

[30] Foreign Application Priority Data
Nov. 7, 1970 Germany............... P 20 54 954.6

[52] U.S. Cl. .................................. 73/212, 73/182
[51] Int. Cl. .......................................... G01p 5/16
[58] Field of Search............................. 73/182, 212

[56] References Cited
UNITED STATES PATENTS
3,443,431   5/1969   Hagen.................................. 73/212
3,267,992   8/1966   Werner et al........................ 73/212
3,482,445   9/1969   DeLeo et al........................ 73/212
2,554,634   5/1951   Paine et al.......................... 73/212
2,662,402  12/1953   Ince, Jr. et al..................... 73/212
2,671,620   3/1954   Andrews............................. 73/182

Primary Examiner—Herbert Goldstein
Attorney—James E. Bryan

[57] ABSTRACT

This invention relates to a flow sonde for measuring the total pressure and the static pressure of a flow comprising a cylindrical forward section, a conical transitional section, a rearward cylindrical section, said forward section having a smaller diameter than said rearward section and the transitions from each section to the next extending in a sharp-edged manner, and aperture means on said sonde for taking the total pressure and the static pressure.

3 Claims, 4 Drawing Figures

PATENTED AUG 7 1973

3,750,470

SHEET 1 OF 2

INVENTOR.
PETER PARTZSCH
BY
James E. Bryan
ATTORNEY

FLOW SONDE FOR MEASURING THE TOTAL PRESSURE AND THE STATIC PRESSURE OF A FLOW

The present invention relates to a flow sonde for measuring the total pressure and the static pressure of a flow, wherein there are apertures at the outer surfaces of the sonde facing the flow which serve for taking or drawing off the total pressure and the static pressure.

In such flow sondes, which are also referred to in the art as static tubes, one obtains by way of a pressure differential measurement, carried out for example by means of a differential pressure manometer, the dynamic pressure which is an important parameter for the lift of a flow body. On the basis of the static pressure it is possible to directly determine the barometric standard altitude (for example the ICAO standard altitude). While the taking of the genuine or true total pressure does not generally involve any major difficulties, the taking of the true static pressure is problematic, particularly when the flow lines have a curved extension or are disturbed by the flight object. Since the static pressure can be measured theoretically only on an infinitely long sonde positioned within the flow, a plurality of constructions of such sondes are already known by means of which the pressure ratios are simulated which arise theoretically at an infinitely long sonde. Thus, it is known for the purpose of measuring the static pressure to dispose at the circumference of a sonde a pressure-removal point (for example an annular slot) which is kept at a specific distance for example from the aircraft fuselage.

It is further known to secure a sonde of this type to an aircraft with a stem or post which has the task of compensating either totally or partially for the static pressure that has been adulterated by the damming effect at the aircraft.

Also ready known in the art is a flow sonde whose measuring section has a conical outer extension, and wherein the measuring section contains the apertures for taking the static pressure. In addition thereto it is further known to so construct a flow sonde that the forward inflow portion being positioned within the flow tapers out toward the flow in order to assure a turbulent boundary layer flow in the entire flow region or area.

The prior art flow sondes have, however, disadvantages and drawbacks which reside particularly in the sensitivity of such sondes at varying speeds in the subsonic, transsonic and supersonic ranges. Moreover, the pressures that are measured with such sondes become more inaccurate during direction changes of the inflow.

The present invention provides for a flow sonde or instrument with the aid of which it is possible to measure both the static pressure and the total pressure, and consequently the dynamic pressure, namely the mach number and Reynold's number, and further provides a flow sonde in such a manner that disturbing influences due to changes in the direction of flow will remain without effect.

This is obtained, in accordance with the present invention, by virtue of the fact that the flow sonde comprises at least two cylindrically-extending portions which contain the measuring section for taking the static pressure, and between which a conical transitional portion is formed, the front or forward cylindrical portion having a smaller diameter than the rearward portion, and the transitions from one portion to the other extending in a sharp-edge manner.

This type of construction of the flow sonde assures that the taking of the static pressure and the total pressure will be independent of influences of the mach number and Reynold's number since there will be produced either delayed or accelerated flow conditions being defined with the various portions or sections, and thus conditions at the measuring sections which are constant over a large speed range. The forward portion of the flow sonde prevents any occurrence of a burbling or separation of air flow in case of greater direction changes within wide speed ranges. As a result thereof, the total pressure as well as the static pressure removal will become independent of the direction within wide speed ranges.

By virtue of the construction and provision of the individual measuring sections and pressure-removal points with respect to each other with sharp-edged transitions from one portion or section to the other, specific flow conditions are assured with a turbulent boundary layer flow within all of the arising speed ranges.

According to another embodiment of the present invention it is further proposed that the diameter of the forward section or portion of the flow sonde be smaller by at least half the diameter of the rearward section or portion. This has the effect that the flow being delayed to the value zero at the stagnation point of the sonde is accelerated as rapidly as possible without separation of the flow to the value to be simulated.

A still further embodiment of the present invention proposes that the sonde be received via a supporting mast being rigidly mounted at the airplane by way of a Cardan joint and that the sonde be maintained by means of a tail unit in the respective direction of air flow. This assures that the measurements will remain uninfluenced within still greater speed ranges by changes in the direction of flow, and that at the same time the angle of pitch and the angle of sideslip can be determined by way of the Cardan joint and by measuring members being combined therewith.

Figure 2:
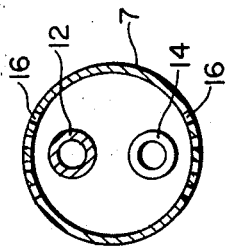
Figure 3:
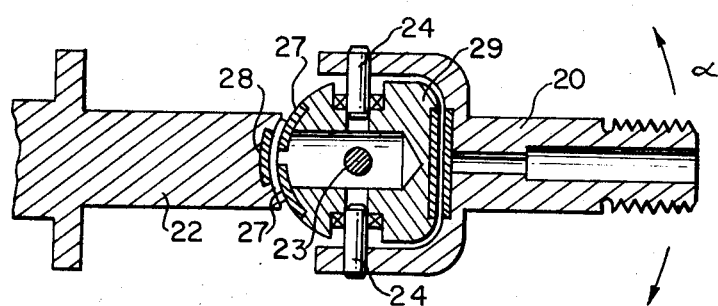
Figure 4:
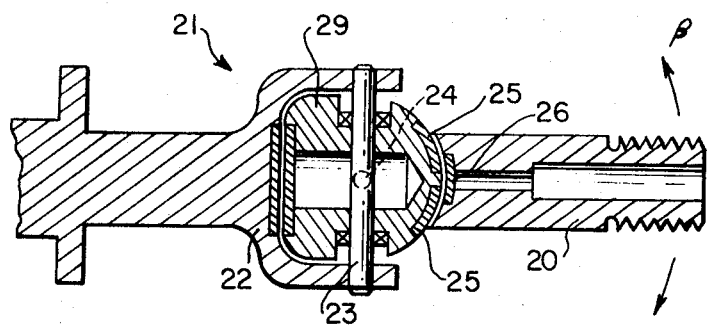

The construction of a sonde according to the present invention is illustrated in the accompanying drawings, wherein FIG. 1 illustrates a sonde according to the present invention in a side view and partially in a longitudinal cross-section, FIG. 2 is a cross-sectional view through the sonde taken along line II—II of FIG. 1, FIG. 3 shows, in a portion from FIG. 1, indicated in dashed-dotted lines and taken along line III—III, a longitudinal section through the Cardan joint, and FIG. 4 shows, in a portion from FIG. 1, taken along the line IV—IV, a longitudinal section through the Cardan joint, the section IV—IV being taken at a right angle with respect to section III—III.

In FIGS. 1 and 2, reference numeral 1 identifies the sonde, reference numeral 2 represents the supporting mast being rigidly mounted at the airplane, and reference numeral 3 designates the annular tail unit at the sonde 1. The outer contour of the sonde 1 with respect to the longitudinal extension thereof is subdivided into the sections 5, 6, 7 and 8, and sections 5 and 7 constitute the measuring sections. The transitions from one to the other of the sections or portions 5, 6, 7 and 8 are provided as sharp edges 9, 10 and 11. The sonde 1 contains in a manner known per se an axial bore 13 which serves for measuring the total pressure and the opening 15 of which at the forward end face of the sonde 1 points against the direction of airflow. A further edge 4 is formed with the outer contour of the forward section 5 and the bore 13. The measuring tube 12 for the total pressure measurement is mounted within the axial bore 13 of the sonde 1. Further mounted within the bore 13 is the measuring tube 14 for taking the static pressure. The two tubes 12 and 14 are connected in a manner known per se to a differential pressure manometer and to an absolute pressure measuring means which has not been further illustrated herein. Mounted at the section 7 of the sonde 1 are radially directed bores 16 being distributed on the circumference which serve for measuring the static pressure and are in operative engagement with the static measuring tube 14 and with the differential pressure manometer, not shown.

FIGS. 3 and 4 illustrate the mounting of the sonde 1 at the supporting mast 2 which is rigidly mounted at the aircraft. Provided for this purpose is a Cardan joint 21 whose members receive electrically-acting angle-measuring instruments. The Cardan joint 21 consists of a forked portion 20 being rigidly mounted at the supporting mast 2 and of a forked portion 22 which is rigidly connected with the sonde 1. The forked portions 20 and/or 22 are pivotal about the axes 23 and/or 24 which are carried by a Cardan intermediate piece 29, and these axes 23 and 24 are positioned at a right angle on top of each other. The axes 24 and/or 23 are mounted parallel to the transverse axis and/or to the yaw axis of the aircraft.

The electrically-acting angle-measuring instruments for determining the angle of pitch $\alpha$ and the angle of sideslip $\beta$ consist of the plates 25, 26 and 27, 28 of two capacitor systems which are connected in a manner known per se with a measuring bridge, not shown. The plates 25 and 27 are mounted at the Cardan intermediate piece 29, whereas the coordinated plates 26 and/or 28 are supported by the forked portion 20 and/or by the forked portion 22.

Since the flow sonde 1 is maintained at all times in the direction of the air flow by means of the tail unit 3 and the Cardan joint 21, there will result during a change in the direction of air flow a relative movement between the plates 25 and 26 at the intermediate piece 29 and at the forked portion 20, and/or a relative movement between the plates 27 and 28 at the intermediate piece 29 and at the forked portion 22, and therewith an influencing of the measuring circuits.

The operation of the sonde with respect to the measurement of the total pressure and the static pressure is as follows During the flow against the sonde 1 as described hereinabove, a turbulent boundary layer flow is obtained at the edge 4 for the forward cylindrical section 5. This flow is maintained along the aforementioned sonde by means of the edges 9, 10 and 11. Along the conical section 6, the flow is accelerated and as a result thereof the flow build-up produced at the finite sonde is essentially compensated for. The adjacent cylindrical section 7 thus represents a seemingly infinite measuring section or path on which the true static pressure is constant over a large speed range and can be taken or drawn-off via the apertures 16. It is apparent therefrom that the position and the size of the static pressure removal apertures 16 have only a secondary significance. By means of the position and inclination of the second conical section 8 it is possible to compensate for the flow influences produced by the sonde carrier, for example an aircraft. Thus the flow at the sonde becomes in a definite manner independent of the aircraft configuration being employed.

It will be obvious to those skilled in the art that many modifications may be made within the scope of the present invention without departing from the spirit thereof, and the invention includes all such modifications. What is claimed is:

1. A flow sonde for measuring the total pressure and the static pressure of a flow, the external configuration of said sonde comprising a forward section cylindrical throughout its length enclosing a forward opening communicating with a means for sensing total pressure, a conical transitional section interconnecting said forward section and at least one rearward cylindrical section, said forward section having a smaller diameter than said rearward section and the transitions from each section to the next being in a sharp-edged manner, and aperture means in said rearward cylindrical section for static pressure removal.

2. A flow sonde according to claim 1 in which the diameter of the forward section is smaller by at least half of the diameter of the rearward section.

3. A flow sonde according to claim 1 including Cardan joint means connecting said sonde to a supporting mast and further including tail unit means on said sonde.

* * * * *